US010922714B2

(12) United States Patent
Dawson et al.

(10) Patent No.: US 10,922,714 B2
(45) Date of Patent: *Feb. 16, 2021

(54) IDENTIFYING SPAM AVATARS IN A VIRTUAL UNIVERSE BASED UPON TURING TESTS

(71) Applicant: International Business Machines Corporation, Armonk, NY (US)

(72) Inventors: Christopher J. Dawson, Arlington, VA (US); Rick A. Hamilton, II, Charlottesville, VA (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 854 days.

This patent is subject to a terminal disclaimer.

(21) Appl. No.: 15/584,221

(22) Filed: May 2, 2017

(65) Prior Publication Data
US 2017/0235947 A1    Aug. 17, 2017

Related U.S. Application Data

(63) Continuation of application No. 12/343,125, filed on Dec. 23, 2008, now Pat. No. 9,704,177.

(51) Int. Cl.
*G06Q 30/02* (2012.01)
(52) U.S. Cl.
CPC ................ *G06Q 30/0248* (2013.01)
(58) Field of Classification Search
CPC ........................ G06Q 30/0241–0277
See application file for complete search history.

(56) References Cited

U.S. PATENT DOCUMENTS 5,852,672 A   12/1998 Lu
6,091,777 A    7/2000 Guetz et al.
(Continued)

FOREIGN PATENT DOCUMENTS

JP    2006106632 A    4/2006

OTHER PUBLICATIONS

Sorkowitz, U.S. Appl. No. 12/115,706, Office Action dated Nov. 10, 2014, 16 pages.

(Continued)

*Primary Examiner* — Jay Huang
(74) *Attorney, Agent, or Firm* — William H. Hartwell; Maxine L. Barasch; Keohane & D'Alessandro, PLLC (57) ABSTRACT

A virtual universe system has a system and method for identifying spam avatars based upon the avatar's behavior characteristics through the use of Turing tests. The system may provide a Turing test unit for performing Turing tests and an analysis unit that compares the behavior characteristics of new or newly changed avatars against the behavior characteristics of known spam avatars to determine if the avatar has known spam avatar characteristics. It may further have a scoring system to calculate a spam score based upon similarities of the comparison and identifying the avatar as a spam avatar based upon the calculated spam score. It may further compare the calculated spam score with a spam score threshold wherein the avatar is identified as a spam avatar if the calculated spam score is equal to or greater than the calculated spam score.

20 Claims, 8 Drawing Sheets

(56) References Cited

U.S. PATENT DOCUMENTS

| | | | |
|---|---|---|---|
| 6,198,850 B1 | 3/2001 | Banton | |
| 6,418,424 B1 | 7/2002 | Hoffberg et al. | |
| 6,457,008 B1 | 9/2002 | Rhee et al. | |
| 6,757,008 B1 | 6/2004 | Smith | |
| 6,879,266 B1 | 4/2005 | Dye et al. | |
| 6,907,571 B2 | 6/2005 | Slotznick | |
| 6,909,429 B2 | 6/2005 | Gottesman et al. | |
| 7,030,905 B2 | 4/2006 | Carlbom et al. | |
| 7,062,088 B1 | 6/2006 | Clauson | |
| 7,072,398 B2 | 7/2006 | Ma | |
| 7,088,846 B2 | 8/2006 | Han et al. | |
| 7,110,950 B2 | 9/2006 | Basso et al. | |
| 7,143,083 B2 | 11/2006 | Carlbom et al. | |
| 7,190,285 B2 | 3/2007 | Dye et al. | |
| 7,263,472 B2 | 8/2007 | Porikli | |
| 7,366,671 B2 | 4/2008 | Xu et al. | |
| 7,444,003 B2 | 10/2008 | Laumeyer et al. | |
| 7,542,588 B2 | 6/2009 | Ekin et al. | |
| 7,598,977 B2 | 10/2009 | Ryall et al. | |
| 7,721,107 B2* | 5/2010 | Golle | G06F 21/34 713/172 |
| 7,760,908 B2 | 7/2010 | Curtner et al. | |
| 7,761,456 B1 | 7/2010 | Cram et al. | |
| 7,801,328 B2 | 9/2010 | Au et al. | |
| 7,868,912 B2 | 1/2011 | Venetainer et al. | |
| 7,961,946 B2 | 6/2011 | Hammadou | |
| 8,131,012 B2 | 3/2012 | Eaton et al. | |
| 8,416,847 B2 | 4/2013 | Roman | |
| 8,537,219 B2 | 9/2013 | Desimone et al. | |
| 8,553,778 B2 | 10/2013 | Desimone et al. | |
| 8,656,476 B2 | 2/2014 | Dawson et al. | |
| 8,687,702 B2 | 4/2014 | Schmit | |
| 9,338,132 B2 | 5/2016 | Dawson et al. | |
| 9,697,535 B2 | 7/2017 | Dawson et al. | |
| 2002/0105529 A1 | 8/2002 | Bowser et al. | |
| 2003/0023595 A1 | 1/2003 | Carlbom et al. | |
| 2003/0025599 A1 | 2/2003 | Monroe | |
| 2003/0063670 A1 | 4/2003 | Masukura et al. | |
| 2003/0074397 A1 | 4/2003 | Morin et al. | |
| 2003/0081685 A1 | 5/2003 | Montgomery | |
| 2004/0194129 A1 | 9/2004 | Carlbom et al. | |
| 2005/0021649 A1* | 1/2005 | Goodman | G06F 21/316 709/207 |
| 2005/0097179 A1 | 5/2005 | Orme | |
| 2005/0108340 A1* | 5/2005 | Gleeson | H04L 51/12 709/206 |
| 2006/0036695 A1 | 2/2006 | Rolnik | |
| 2006/0056518 A1 | 3/2006 | Conklin | |
| 2006/0062478 A1 | 3/2006 | Cetin et al. | |
| 2006/0136219 A1* | 6/2006 | Wang | G06F 21/31 704/273 |
| 2006/0168041 A1* | 7/2006 | Mishra | H04L 29/1215 709/206 |
| 2006/0187305 A1 | 8/2006 | Trivedi et al. | |
| 2006/0279630 A1 | 12/2006 | Aggarwal et al. | |
| 2007/0032221 A1 | 2/2007 | Badt | |
| 2007/0078699 A1 | 4/2007 | Scott et al. | |
| 2007/0079379 A1 | 4/2007 | Sprosts et al. | |
| 2007/0083929 A1 | 4/2007 | Sprosts et al. | |
| 2007/0190990 A1 | 8/2007 | Yin | |
| 2007/0220607 A1 | 9/2007 | Sprosts et al. | |
| 2007/0257986 A1 | 11/2007 | Ivanov et al. | |
| 2008/0022384 A1 | 1/2008 | Yee et al. | |
| 2008/0037880 A1 | 2/2008 | Lai | |
| 2008/0097946 A1 | 4/2008 | Oliver et al. | |
| 2008/0104180 A1* | 5/2008 | Gabe | G06Q 10/107 709/206 |
| 2008/0120558 A1 | 5/2008 | Nathan et al. | |
| 2008/0195713 A1 | 8/2008 | Benschop et al. | |
| 2008/0204450 A1* | 8/2008 | Dawson | G06Q 30/02 345/419 |
| 2008/0208674 A1* | 8/2008 | Hamilton | G06Q 30/02 705/14.12 |
| 2008/0208749 A1 | 8/2008 | Wallace et al. | |
| 2008/0215995 A1 | 9/2008 | Wolf | |
| 2008/0235582 A1 | 9/2008 | Zalewski et al. | |
| 2008/0252723 A1 | 10/2008 | Park | |
| 2008/0263446 A1 | 10/2008 | Altberg et al. | |
| 2008/0303811 A1 | 12/2008 | Van Luchene | |
| 2009/0055484 A1 | 2/2009 | Vuong et al. | |
| 2009/0106318 A1* | 4/2009 | Mantripragada | H04L 63/1408 |
| 2009/0132361 A1* | 5/2009 | Titus | G06Q 10/10 705/14.23 |
| 2009/0144829 A1* | 6/2009 | Grigsby | G06F 21/6263 726/26 |
| 2009/0210505 A1 | 8/2009 | Thomas et al. | |
| 2009/0282075 A1 | 11/2009 | Dawson et al. | |
| 2009/0287566 A1 | 11/2009 | McAfee | |
| 2010/0162403 A1 | 6/2010 | Dawson et al. | |
| 2010/0162404 A1 | 6/2010 | Dawson et al. | |
| 2010/0239016 A1 | 9/2010 | Deimone et al. | |
| 2010/0306853 A1 | 12/2010 | Dawson et al. | |
| 2010/0332468 A1 | 12/2010 | Cantrell | |
| 2011/0041181 A1 | 2/2011 | Niccolini et al. | |
| 2011/0096149 A1 | 4/2011 | Au et al. | |
| 2014/0137229 A1 | 5/2014 | Dawson et al. | |

OTHER PUBLICATIONS

Huang, U.S. Appl. No. 12/342,943, Notice of Allowance dated Jul. 9, 2015, 17 pages.
Sorkowitz, U.S. Appl. No. 12/115,706, Office Action dated Jun. 19, 2014, 17 pages.
Huang, U.S. Appl. No. 12/343,125, Notice of Allowance dated Jul. 6, 2015, 18 pages.
Sorkowitz, U.S. Appl. No. 12/115,706, Office Action dated Apr. 9, 2015, 34 pages.
Huang, USPTO Office Action, U.S. Appl. No. 12/342,943, Notification dated Jan. 8, 2015, 30 pages.
Huang, USPTO Office Action, U.S. Appl. No. 12/343,125, Notification dated Jan. 9, 2015, 30 pages.
Ziliani et al., "Effective Integration of Object Tracking in a Video Coding Scheme for Multisensor Surveillance Systems", International Conference on Image Processing, Rochester, NY, Sep. 22-25, 2002, vol. 1, pp. 521-524.
Dimitrova et al., "Motion Recovery for Video Content Classification", ACM Transactions on Information Systems, vol. 1, No. 4, Oct. 1995, pp. 408-439.
Ying-Li Tian, "Event detection, query, and retrieval for video surveillance", Artificial Intelligence for Maximizing Content Based Image Retrieval, Chapter XV, Publication Date Nov. 26, 2008 pp. 342-370.
Luciano Da Fontoura Costa et al., "Shape Analysis and Classification", Published in 2001 by CRC Press, 3 pages.
Maytham H. Safar et al., "Shape Analysis and Retrieval of Multimedia Objects", Copyright 2003 by Kluwer Academic Publishers, 3 pages.
Brigitte Chiarizia, PCT Communication Relating to the Results of the Partial International Search, International Application No. PCT/EP2010/052636, International Filing Date Mar. 2, 2010, 2 pages.
Brigitte Chiarizia, PCT Notification of Transmittal of the International Search Report and the Written Opinion of the International Searching Authority, or the Declaration, International Application No. PCT/EP2010/052636, International Filing Date Mar. 2, 2010, 5 pages.
Daniel M. Sorkowitz, USPTO Office Action, U.S. Appl. No. 12/115,706, Notification dated Dec. 30, 2010, 23 pages.
Daniel M. Sorkowitz, USPTO Final Office Action, U.S. Appl. No. 12/115,706, Notification dated Apr. 5, 2011, 16 pages.
Tsan-Yu J. Huang, USPTO Office Action, U.S. Appl. No. 12/342,943, dated May 12, 2011, 32 pages.
Tsan-Yu J. Huang, USPTO Final Office Action, U.S. Appl. No. 12/342,943, dated Aug. 18, 2011, 27 pages.
Tsan-Yu J. Huang, USPTO Office Action, U.S. Appl. No. 12/343,125, dated May 12, 2011, 37 pages.
Tsan-Yu J. Huang, USPTO Final Office Action, U.S. Appl. No. 12/343,125, dated Sep. 19, 2011, 41 pages.

(56) References Cited

OTHER PUBLICATIONS

Carlton Johnson, USPTO Office Action, U.S. Appl. No. 12/473,817, dated Dec. 8, 2011, 21 pages.
Carlton Johnson, USPTO Final Office Action, U.S. Appl. No. 12/473,817, dated Jul. 3, 2012, 16 pages.
Carlton Johnson, USPTO Office Action, Application U.S. Appl. No. 12/473,817, dated Oct. 23, 2012, 21 pages.
Carlton Johnson, USPTO Final Office Action, U.S. Appl. No. 12/473,817, Notification dated Feb. 25, 2013, 28 pages.
Carlton Johnson, USPTO Office Action, U.S. Appl. No. 12/473,817, Notification dated Aug. 16, 2013, 26 pages.
Carlton Johnson, USPTO Notice of Allowance and Fee(s) Due, U.S. Appl. No. 12/473,817, dated Oct. 8, 2013, 26 pages.
Sorkowitz, U.S. Appl. No. 12/115,706, Office Action dated Jul. 14, 2016, 39 pages.
Huang, Tsan-Yu J, U.S. Appl. No. 12/343,125, Notice of Allowance, dated Mar. 1, 2017, 27 pgs.
Huang, Tsan-Yu J, U.S. Appl. No. 12/342,943, Notice of Allowance, dated Mar. 3, 2017, 28 pgs.
Daniel M. Sorkowitz, USPTO Final Office Action, U.S. Appl. No. 12/115,706, Notification dated Nov. 28, 2016 21 pages.
Carlton Johnson, USPTO Office Action, U.S. Appl. No. 14/161,841, Notification dated Aug. 29, 2014, 41 pages.
Carlton Johnson, USPTO Final Office Action, U.S. Appl. No. 14/161,841, Notification dated Oct. 2, 2014, 25 pages.
Carlton Johnson, USPTO Office Action, U.S. Appl. No. 14/161,841, Notification dated Apr. 27, 2015, 29 pages.
Carlton Johnson, USPTO Final Office Action, U.S. Appl. No. 14/161,841, Notification dated Nov. 5, 2015, 3 pages.
Carlton Johnson, USPTO Notice of Allowance and Fee(s) Due, U.S. Appl. No. 14/161,841, dated Feb. 11, 2016, 10 pages.
Huang, U.S. Appl. No. 12/343,125, Notice of Allowability, dated Jul. 15, 2015, 6 pgs.
Sorkowitz, Daniel M., U.S. Appl. No. 12/115,706, Examiner's Answer, dated Aug. 21, 2017, 9 pgs.
Huang, Jay, U.S. Appl. No. 15/584,270, Office Action dated Jan. 23, 2020, 43 pgs.
Huang, Jay, USPTO Final Office Action, U.S. Appl. No. 15/584,270, Notification dated Jul. 27, 2020, 15 pages.
Huang, Jay, USPTO Notice of Allowance, U.S. Appl. No. 15/584,270, Notification dated Oct. 6, 2020, 13 pages.

\* cited by examiner

IDENTIFYING SPAM AVATARS IN A VIRTUAL UNIVERSE BASED UPON TURING TESTS

CROSS-REFERENCE TO RELATED APPLICATIONS

The present patent document is a continuation of U.S. patent application Ser. No. 12/343,125 filed Dec. 23, 2008, the entire contents of which is incorporated herein by reference.

FIELD OF THE INVENTION

Aspects of the present invention provide a system and method for identifying avatar-based unsolicited advertising in a virtual universe. Using an embodiment of the present invention, advertising and/or offerings for sale of virtual and real goods and services masquerading as computer controlled avatars may be identified and managed. The spam avatar may be identified by its behavior or its responses to a Turing test.

BACKGROUND OF THE INVENTION

A computer avatar is a personalized graphic file or rendering that represents a computer user. In virtual worlds, the avatar is a fully rendered interactive character.

A virtual world is an animated three-dimensional world created with computer-graphics imagery (CGI) and other rendering software. In a virtual world, an avatar may interact within a virtual environment. The avatar manipulates and interacts with objects in the virtual world by mouse movements and keystrokes issued by the user.

Avatars in a virtual world or virtual universe (VU) have a wide range of business and social experiences, and such experiences are becoming more important as business and social transactions are becoming common in VUs such as the Second Life® virtual world. Second Life is a privately owned three-dimensional (3-D) virtual world, made publicly available in 2003 by Linden Research, Inc., and is created entirely by its membership. Second Life is a registered trademark of Linden Research, Inc. sometimes referred to as Linden Lab.

As the population of VUs increases, and as the density and intensity of personal activities and commercial transactions increase, greater emphasis may be placed on advertising. Just as in the real world, innovative and intrusive advertising activities will be launched and widely distributed. Unlike the real world, advertising in VUs is much less constrained by the limiting laws of physics and economics. One advertising mechanism marries unsolicited personal messaging ("spam") with the concept of automated computer controlled advertising avatars that roam around the VU looking to communicate with potential human-controlled avatars.

In some systems, advertisement avatars are automated. Automated avatars can create situations similar to that spam emails can cause in an email communication system, a.k.a., "avatar-based VU spam".

SUMMARY OF THE INVENTION

In general, aspects of the present invention provide a system and methods for identifying spam avatars, also called offering or advertisement avatars, used for offering unsolicited advertising purposes, and, specifically, to a system and methods to identify spam avatars based upon the avatar's behavior through analyses such as behavior analysis and Turing test analysis.

One embodiment of the present invention is a method in a virtual universe (VU) system for identifying spam avatars, the VU system having one or more avatars, each having behavioral characteristics. The method may have the steps retrieving from an avatar its behavioral characteristics, identifying the similarities of the retrieved behavioral characteristics with behavioral characteristics of known spam avatars and identifying the avatar as a spam avatar based upon the similarities.

The method may further determine whether the avatars are able to calculate sums, conduct a dualistic test, conduct a mind brain identity test, conduct a functionalism test and a behaviorism test and identify the avatars that do not pass any of the tests as spam avatars.

One embodiment of the system for identifying spam avatars based upon behavior characteristics in a virtual universe (VU) of the present invention may have a VU processing unit, a behavior characteristics analysis unit, a memory unit that stores behavior characteristics of known spam avatars, a communications channel for allowing the VU processing unit and a Turing test unit. The spam avatar identification system may retrieve behavior characteristics from an avatar. It may further retrieve the behavior characteristics of the known avatars from the memory unit and may identify similarities between the behavior characteristics from the avatar and the behavior characteristics of the known avatars. It may then identify the avatar as a spam avatar based upon the similarities. It may also conduct Turing tests to determine whether the avatars are able to calculate sums, conduct a dualistic test, conduct a mind brain identity test, conduct a functionalism test and a behaviorism test and identify the avatars that do not pass any of the tests as spam avatars.

Another embodiment of the system of present invention may have a graphics recognition unit, an audio recognition unit, a behavior recognition unit and an analysis unit that recognizes the behavior characteristics of the avatar that are positional movement, bodily movement, or voice recognition characteristics.

Another embodiment of the present invention is a computer program product embodied in a computer readable medium for operating in a system comprising a network I/O, a CPU, and one or more databases, for implementing a method in a virtual universe (VU) system for identifying spam avatars, the VU system having one or more avatars that each have behavior characteristics, the VU system having memory that stores behavior characteristics of known spam avatars, wherein at least one of the avatars is a spam avatar, the method for identifying spam avatars having the steps of retrieving from an avatar its behavior characteristics, identifying the similarities of the retrieved behavior characteristics with behavior characteristics of known spam avatars, and identifying the avatar as a spam avatar based upon the similarities.

Another embodiment of the method of the present invention is a method for deploying a spam avatar identification system in a virtual universe (VU) for managing spam avatars, the VU having one or more avatars, at least one of the avatars being a spam avatar, the spam avatar identification system having a behavior characteristics analysis unit, a memory unit that stores behavior characteristics of known spam avatars, a communications channel for allowing the VU processing unit, the memory unit and the behavior characteristics analysis unit to identify the spam avatar, wherein the spam avatar identification system retrieves behavior characteristics from an avatar, retrieves the behavior characteristics of the known avatars from the memory unit, identifies similarities between the behavior characteristics from the avatar and the behavior characteristics of the known avatars and identifies the avatar as a spam avatar based upon the similarities.

Another embodiment of the method of the present invention is a method in a virtual universe (VU) for identifying spam avatar, the VU system having one or more avatars that each have behavior characteristics, the VU system having memory that stores behavior characteristics of known spam avatars, wherein at least one of the avatars is a spam avatar, each of the avatars having a real-world client, the method having the steps of monitoring the real-world client of an avatar to determine whether the real-world client remains active for a non-human amount of time, examining the IP address of the avatar to determine if the IP address belonged to known spam avatars, examining the time the real-world client registered to determine whether the time corresponds with the times of registration of known spam avatars and identifying an avatar based upon the examination.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention.

DETAILED DESCRIPTION OF THE INVENTION

Aspects of the present invention provide a solution for identifying spam avatars used for offering unsolicited advertising purposes based upon the behavior characteristics of the spam avatar and conducting Turing tests with the spam avatars. The system and method of the present invention provide the ability to quickly identify such spam avatars.

Figure 1:
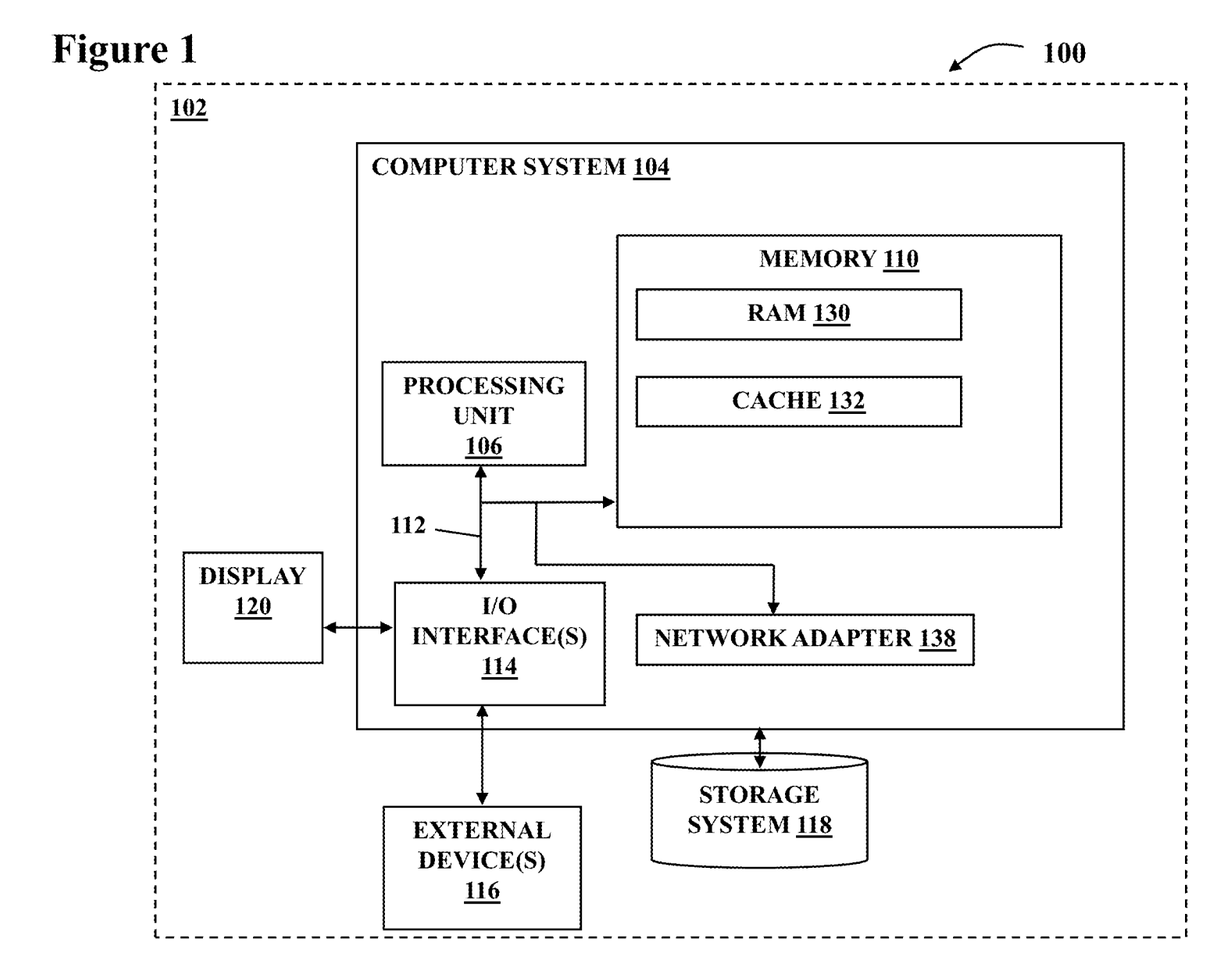
FIG. 1 shows a data processing system suitable for implementing an embodiment of the present invention.

A data processing system 100, such as system 102 shown in FIG. 1, suitable for storing and/or executing program code of the present invention may include a computer system 104 having at least one processor (processing unit 106) coupled directly or indirectly to memory elements through a system bus 112. The memory elements can include local memory (RAM 130) employed during actual execution of the program code, bulk storage (storage 118), and cache memories (cache 132) that provide temporary storage of at least some program code in order to reduce the number of times code must be retrieved from bulk storage 118 during execution. Input/output or I/O devices (external devices 116) (including but not limited to keyboards, displays (Display 120), pointing devices, etc.) can be coupled to the system either directly or through intervening I/O controllers (I/O Interface(s) 114).

Figure 2:
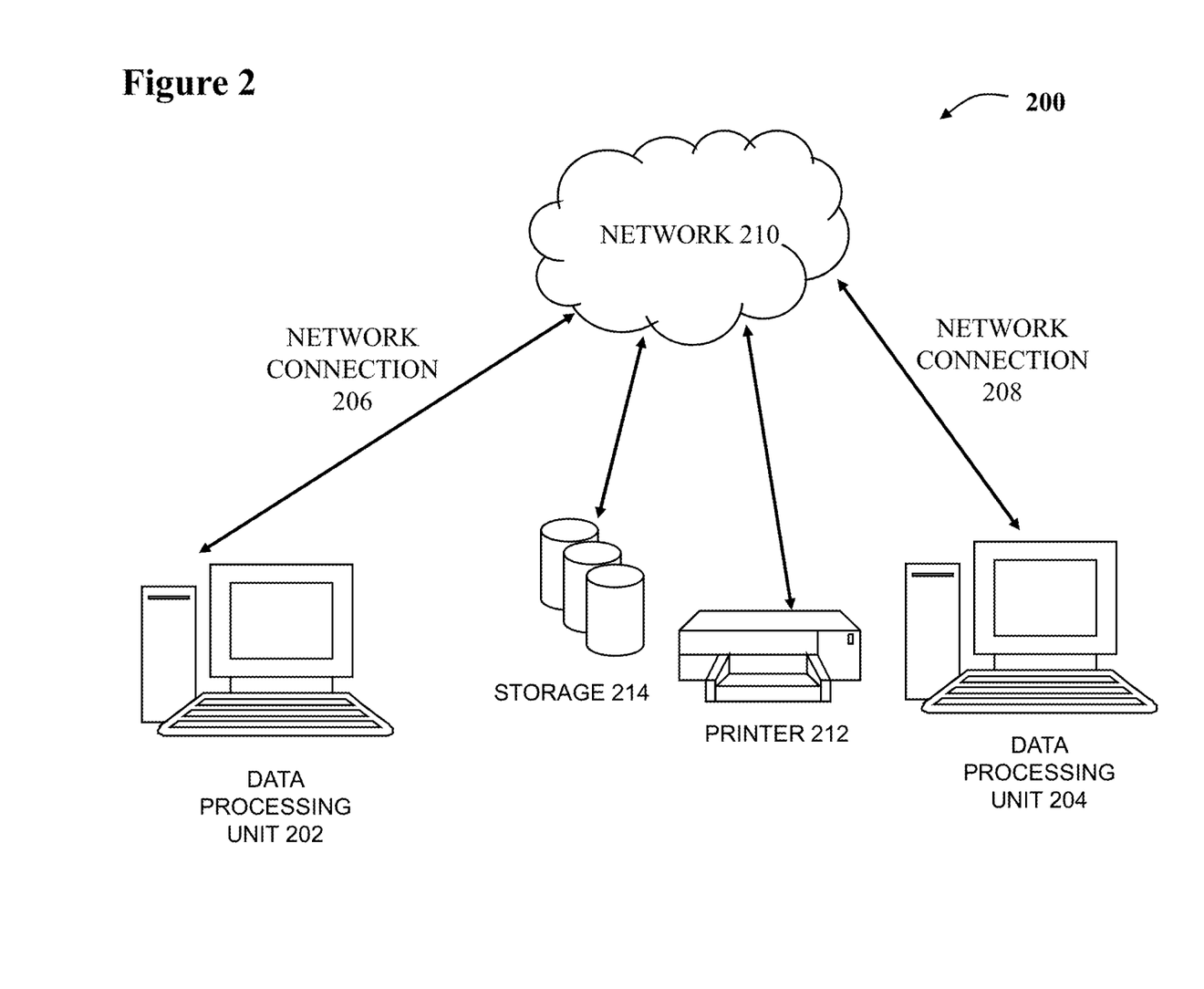
FIG. 2 shows a network that would work with an embodiment of the present invention.

Network adapters (network adapter 138) may also be coupled to the system 200 to enable the data processing system (as shown in FIG. 2, data processing unit 202) to become coupled through network connections (Network Connection 208) to other data processing systems (data processing unit 204), remote printers (printer 212) and/or storage devices (storage 214) through intervening private and/or public networks (network 210).

The present invention comprises a system and method of detecting, analyzing, and managing unsolicited advertisements to VU users through unsolicited communication made by human and computer controlled advertising avatars. Both the residents and owners of VUs would benefit from methods to reduce VU avatar spam such as described herein.

Residents (such as in Second Life) are represented in the environment by an avatar. The basic avatar is humanoid in shape that may be customized in a variety of ways:

- a series of GUI controls, modifying every aspect of the basic mesh (body shape, skin, hair style etc.);
- creating clothing or buying clothes made by other Residents;
- attachments—3D objects intended to supplement or replace body structure, clothes or hair;
- animation overriders (intended to supplement or replace the stock set of animations) using, for instance, a scripting language such as Linden Scripting Language (LSL) to trigger animations stored in an animation file format such as Biovision Hiearchy (BVH); and/or
- sonic overriders—using a scripting language such as LSL to trigger sounds such as footsteps, or emotive cues such as laughing and crying.

The result can either be faithful to the original humanoid avatar, or can result in a completely non-humanoid representation of the character. These customizations can be packaged up into a single outfit, with common applications of outfits.

As noted above, the VU environment provides an opportunity for commercial vendors to market their wares and conduct other commerce with others who are resident in the VU via avatars. Many times, the commercial vendor may customize its avatar so that the avatar has readily distinguishable visual characteristics, audio characteristics or otherwise distinguishable by other of the avatar's assets. The purpose, of course, is to attract the attention of other avatars (potential customers) or to send unsolicited information about a product or service and so on ("advertisement") so that the commercial vendor's avatar ("offering avatar" or "spam avatar"), and ultimately the commercial vendor, may receive business as a result of the advertisement from one or more recipients of the advertisement ("receiving avatars"). Like all other types of unsolicited marketing via any communication means (e.g., telephone, fax, email, text messaging, etc.), all herein referred as spam, it may be unwanted by one or more of the receiving avatars.

For the purpose of this invention, the term "offering avatar" or "spam avatar" refers to the avatar advertising a service or product. The terms "offering avatar", "advertising avatar" and "spam avatar" may be used interchangeably in this document. Furthermore, the term "receiving avatar" refers to the avatar who receives unsolicited information about a product or service.

Figure 3:
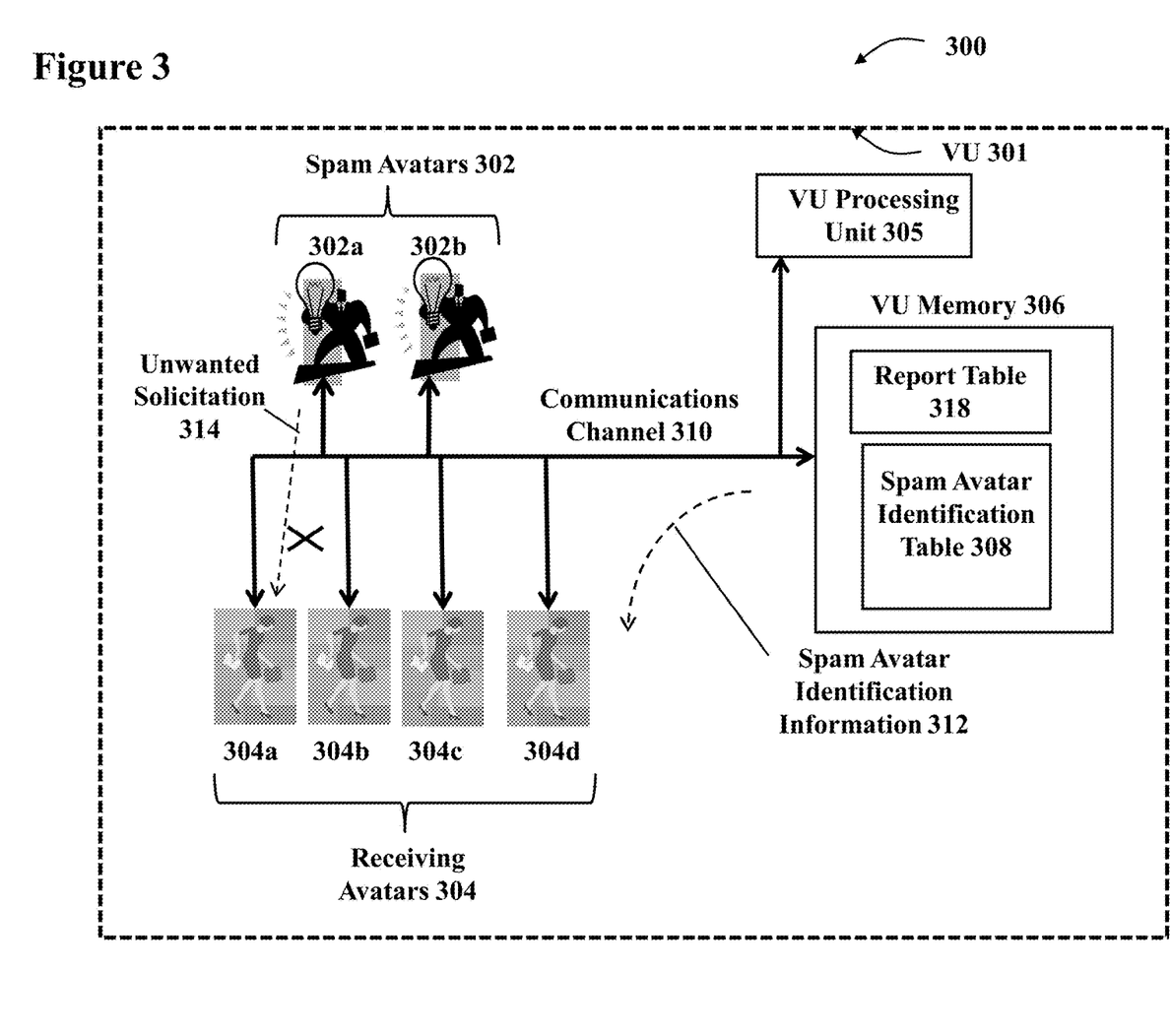
FIG. 3 illustrates an embodiment of the system of the present invention.

A simple avatar system 300 for implementing the present invention is shown in FIG. 3 having a VU 301 having a VU processing unit 305, a VU memory 306 for storing information about the VU 301 and activities and avatars within the VU 301, one or more spam avatars 302 (302a, 302b) and one or more receiving avatars 304 (304a, 304b, 304c, 304d). There can be any number of spam avatars 302 and receiving avatars 304. The spam avatars 302 and the receiving avatars 304 can communicate with one another, amongst themselves and with VU memory 306 or other assets (such as avatar attachments, vehicles, buildings, furniture, sculpture or other items) in the VU 301 via communications channel 310. Both the spam avatars 302 and the receiving avatars 304 are considered to be VU residents.

There is a need for the receiving avatars to have the ability to identify the spam avatars so that the receiving avatars may block the unsolicited communications from the spam avatars should the receiving avatars so desire.

Receiving avatars may choose which solicitations to accept or reject. For instance, a receiving avatar may choose to accept all solicitations from all spam avatars, to accept solicitations from particular spam avatars and to reject all solicitations from all other spam avatars, or to reject all solicitations from all spam avatars.

One embodiment of the system and method of the present invention identify VU spam via characteristics analysis wherein the characteristics are behavior characteristics. In general, behavior may include a combination of text, audio, animation, video, and interactivity content forms in order to identify non-human behavior. It may include other forms, such as positional or bodily movement activities, as well. The behavior of avatars may be determined by examining the avatars using Turing tests.

Animation creates an illusion of movement such as an avatar walking around, jumping up and down, shaking hands, etc., in the virtual universe. An avatar may display particular known animation characteristics that may help indicate that that the avatar is a spam avatar. An example of an animation characteristic of a potential spam avatar may be that the avatar walks up to other avatars and shaking hands with each of the avatars. This could be coupled with a known word/voice pattern such as "Hi! How are you? I can help you save money (lose weight, get a better insurance rate, etc)."

The interactivity characteristics of an avatar may assist in determining whether the avatar is a spam avatar. For example, a noninteractive avatar, i.e., when an avatar's action or message is not related to previous actions or messages conveyed to or by him, may indicate that the avatar is a spam avatar. Or, a reactive avatar, i.e., when an avatar's actions or messages are related only to one immediately previous action or message, may indicate that the avatar is a spam avatar. Finally, an interactive avatar, i.e., when an avatar's actions or messages are related to a number of previous actions or messages and have a relationship between them, may indicate that the avatar is a spam avatar. Interactivity is similar to the degree of responsiveness, and is examined as a communication process in which each message is related to the previous messages exchanged, and to the relation of those messages to the messages preceding them. An example of an interactivity characteristic that can be used to identify a computer operated offering or spam avatar could be that the avatar is only responsive to its own questions regarding its own products or services—not to unrelated responses. As computer related spam avatars become more sophisticated however, corresponding detection schemes will need to become more sophisticated.

Non-human characteristics can be used to identify non-human avatars through "Turing tests." (The Turing test is a test of an avatar's capability to demonstrate human intelligence.) An advertising, or spam, avatar may be likely be computer controlled rather than human controlled. Therefore, a simple random and periodic Turing test against an avatar may determine non-human or human characteristics of the avatar. If the results of the Turing test determine that the avatar is non-human controlled, it can be placed on the "black list" or being tagged with being a non-human controlled avatar.

Turing tests can be invoked upon avatar creation, at random and periodic intervals, upon receiving a report of a suspected offering avatar, or upon request of another avatar. It may be conducted each time the avatar enters or moves between virtual worlds. The greater the pool of questions is and the more often the questions are changed, the more difficult it will be for spam avatar developers to write programs to supply answers to fool tests. Similarly, the wider the number of features used in the test, the more likely the chance of success. For example, difficulty may be increased to automate responses by using graphics such as CAPTCHAs, and using audio streams of questions that are dynamically manipulated each time to make pattern analysis and audio file size less reliable. A CAPTCHA is a type of challenge-response test used in computing to determine whether the user is human. It is a contrived acronym for "Completely Automated Public Turing test to tell Computers and Humans Apart." For another example, asking the avatar to perform an action rather than just answer a question, such as, "Hop on your left leg." Also, asking the avatar to repeat a series of demonstrated actions, where the actions are randomly calculated and achievable can assist in detecting avatars. An unsophisticated nonhuman avatar might be programmed to simply repeat all movement following such a request, the preciseness of which would be an indication. With randomly calculated but probably unachievable actions, a human avatar would most likely not be able to duplicate a lengthy sequence of very complex movements simply because most humans can't remember that much information upon one visualization, and also a demonstrated sequence could be performed faster than a human could perform it, which an automated avatar would perform, proving it isn't human.

As discussed above, the UUID of the avatar, the score of the test, and other information such as date and time of test and index of questions or methods used in the test is added to a report table, for later processing. Rapid discrimination of software from humans may have a number of other applications including allowing human users to, in-world, offer spontaneous Turing Tests to avatars they meet, to make their own determinations; or decisions by region owners to only allow human-based avatars into a region (for obvious business reasons).

Thus, periodic determination, and optional publication, of software-versus-human control for avatars may result it unsolicited advertising and Combinations of these behavior characteristics (such as voice, animation, interactivity, movement, etc.) can be examined together to determine, for example, the behavior of the avatar and, at the same time, other behavior characteristics (appearance, audio (jingles), etc.) may be used to assist to identify the spam avatar.

Once spam avatars are identified, it is important that there is a record of the spam avatar for reference by receiving avatars and the VU. FIG. 3 illustrates the VU 300 of the present invention in greater detail. As shown in FIG. 3, VU memory 306 has a spam avatar identification table 308 for storing spam avatar identification information either preloaded or gathered as spam avatars are identified. This identification information is distributed to receiving avatars 304 from the VU memory 306 and spam avatar identification table 308 via communications channel 310 (spam avatar identification information 312) for later use by receiving avatars 304. It should be noted that spam avatar identification information 312 could as easily be stored in a central location (i.e., spam avatar identification table 308) in the VU for easy access by the receiving avatars 304. Receiving avatars 304 may use this spam avatar identification information 312 to reject an unwanted solicitation from an offering or spam avatar. For instance, as shown in FIG. 3, spam avatar 302a sends an unwanted solicitation 314 to receiving avatar 304a. The receiving avatar 304a parses the unwanted solicitation 314 to find information about the sender such as the unique identifier, or UUID, and compares the UUID against the UUIDs of known spam avatars (stored in spam avatar identification information 312 stored either locally in receiving avatar 304a or in VU server 308) to reject the unwanted solicitation 314.

Receiving avatars may choose which solicitations to accept or reject. For instance, a receiving avatar may choose to accept all solicitations from all spam avatars, to accept solicitations from particular spam avatars and to reject all solicitations from all other spam avatars, or to reject all solicitations from all spam avatars.

VU Memory 306 may further have a report table 318 for storing information about an identified offering or spam avatar. For example, if an avatar is identified as a spam avatar, the UUID of the potential advertising asset, the UUID of the avatar associated with the asset, and any other information is added to the report table 318, for later processing. An example of other information can include details of the behavior characteristics that the avatar or asset characteristics were determined to be similar to, and a score can be calculated by the scoring system 320 to convey probability of a match to be discussed further hereinbelow.

Figure 4:
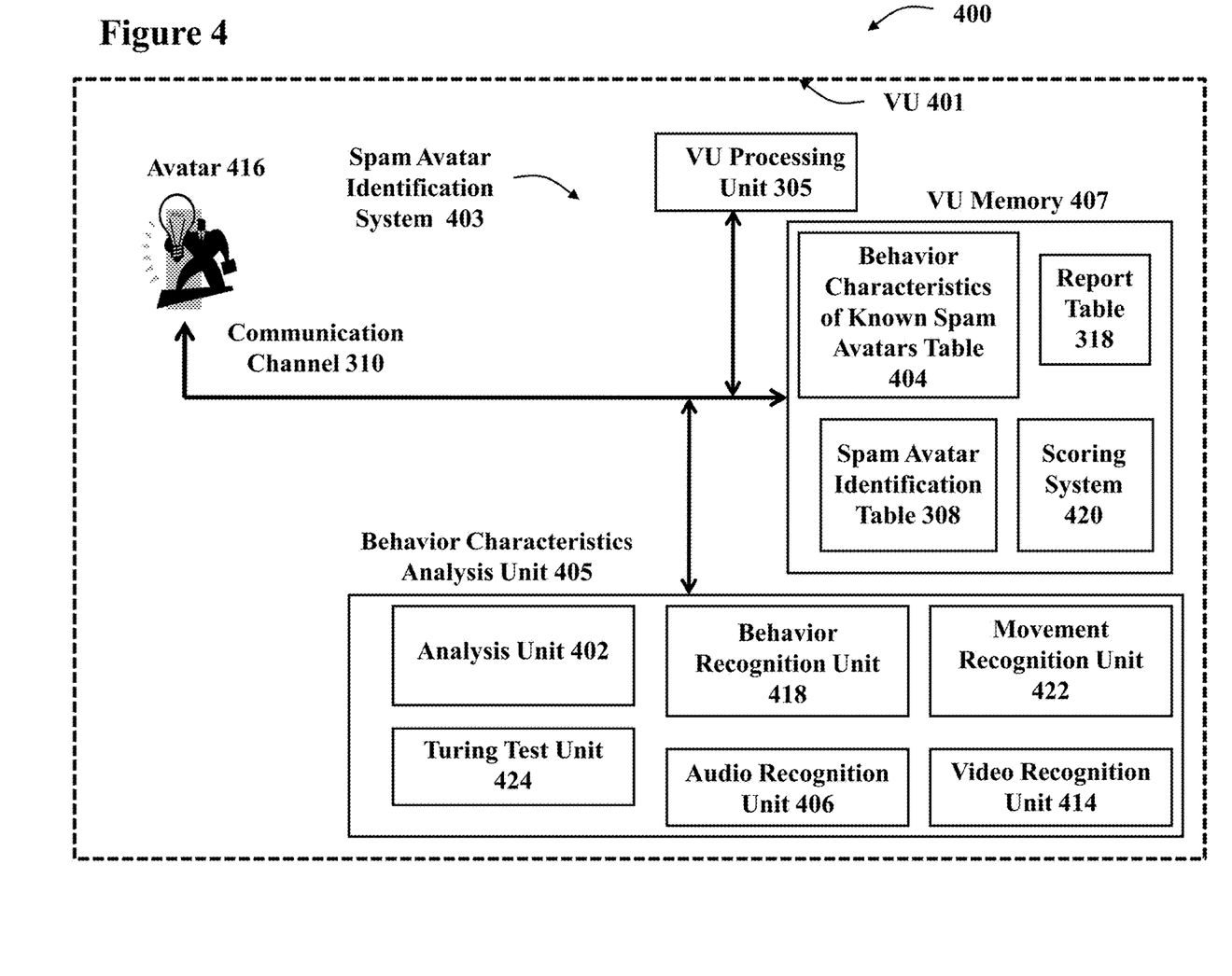
FIG. 4 illustrates an embodiment of the behavior characteristics analysis system of the present invention.

The system 400 of an embodiment of the present invention is shown in more detail in FIG. 4. Behavior characteristics, including other identifying characteristics, such as behavior characteristics and non-human characteristics, of the spam avatar can be retrieved and analyzed using a system such as one of the type shown in FIG. 4 as will be discussed further hereinbelow. System 400 may have VU 401 which may have a spam avatar identification system 403. Spam avatar identification system 403 may be used by system 400 to identify spam avatars in VU 401. Spam avatar identification system 403 may have a VU processing unit 305, a VU memory 306 and a communication channel 310 that may offer communications within VU 401 and a behavior characteristics analysis unit 405.

As discussed in the context of FIG. 3, VU memory 306 may have a spam avatar identification table 308 that may store information about known spam avatars which exist, have existed or may exist in VU 401 and a report table 318 for storing information about an identified offering or spam avatar. VU memory 306 may have a behavior characteristics of known spam avatars table 404 which may store behavior files, such as, for example, graphics, text, or audio files, or files having data indicating movements of known spam avatars. Behavior characteristics of known spam avatars table 404 may be preloaded with behavior information of known spam avatars and may be updated as such information becomes available. VU memory 306 may also have a scoring system 420. Scoring system 420 may be used by the spam avatar identification system 403 to track "spam" scores for avatars. "Spam" scores may be used to identify a spam avatar if the avatar's spam score meets or exceeds a spam threshold. If so, the avatar may be identified as a spam or offering avatar. Spam scores for an avatar may be incremented or decremented by the similarities or dissimilarities between behavior characteristics of the avatar being analyzed and the behavior characteristics of known spam or offering avatars.

VU 401 further may have a behavior characteristics analysis unit 405 that may retrieve, or obtain, and may analyze an avatar's characteristics, such as the behavior characteristics of the avatar. For example, in FIG. 4, when a new avatar 416 enters into VU 401, spam avatar identification system 403 may retrieve the new avatar's characteristics, including the new avatar's behavior characteristics, for analysis. Other characteristics could be behavior characteristics, that may include an avatar's movement used in conjunction with, e.g., voice data, or non-human characteristics, each of which could be a combination of behavior characteristics as noted above.

Behavior characteristics analysis unit 405 may have an analysis unit 402 for analyzing information obtained from an avatar. Behavior characteristics analysis unit 405 may also have a speech to text conversion unit 408 that may convert speech of an avatar to text so that the speech (possibly in the form of statements, instructions, queries, offers, etc.) may be understood. Behavior characteristics analysis unit 405 may also have an OCR (optical character recognition)/text look-up unit 410 that may retrieve text from speech to text conversion unit 408 or otherwise and may look up the text. OCR/text look-up unit 410 may also retrieve text characters in the form of graphics that are recognized by an OCR portion and converted to text for look-up. Such text may indicate the avatar's name, company name, owner name or provide other information about the avatar. Information derived from speech to text conversion unit 408 and OCR/text look-up unit 410 may be passed to analysis unit 402 for providing analysis of the information. Behavior characteristics analysis unit 405 may also have an audio recognition unit 406 that may retrieve audio files from an avatar for analysis. Audio recognition unit 406 may retrieve audio files from avatars and may examine the files. The audio files may be in any suitable file format, such as, for example, .wav or .mp3. Behavior characteristics analysis unit 405 may also have a graphics recognition unit 412 that may retrieve graphics files from avatars. Graphics, or image, files may be in any suitable format such as, for example, TIFF (tagged image file format), GIF (graphics interchange format), or PDF (portable document format). Behavior characteristics analysis unit 405 may also have a video recognition unit 414 that may retrieve video files from avatars. Video files may be of any suitable format such as MPEG-2, MPEG-4 or WMV, for example. Behavior characteristics analysis unit 405 may also have a behavior recognition unit 418 that may retrieve behavior data from avatars that may indicate the likelihood that an avatar is a spam avatar. Such data may include data related to an avatar's positional or bodily movement, an avatar's speech and/or an avatar's interactivity.

Turing test unit 424 may perform a number of tests by querying an avatar. For example, Turing test unit 424 may determine whether any of the avatars is unable to calculate sums as machine-controlled avatars may not be able to calculate sums. Turing test unit 424 further may conduct a dualistic test and a mind brain identity test. Turing test unit 424 may further conduct a functionalism test and a behaviorism test.

Turing test unit 424 may query a suspicious avatar to calculate a sum. For instance, Turing test unit 424 may query the avatar to provide the sum of two and three. Many times, machine controlled avatars are not able to perform the calculation and therefore may be identified as spam avatars.

Turing test unit 424 may query a suspicious avatar in the form of a dualistic test. Dualism is a major school of thought that attempt to resolve the mind-body problem. Substance Dualists argue that the mind is an independently existing substance, whereas Property Dualists maintain that the mind is a group of independent properties that emerge from and cannot be reduced to the brain, but that it is not a distinct substance. A dualistic test challenges the suspicious avatar on dualistic principles.

Turing test unit 424 may query a suspicious avatar (mind brain identity test) Identity Theory supposes that brain states are identical to mental states. However, there are problems with this. If I say, "I am in pain" it is not the same as saying, "The C-fibers in my brain are firing". But, if mental states and brain states are identical, shouldn't these two statements mean the same thing? If not, and certain types of neurological process cannot be matched up with certain types of mental state, then something over and above simple physical processes must be taking place.

Turing test unit 424 may query a suspicious avatar based upon functionalism principles, i.e., the functionalism test. Functionalism is currently the most popular and well-known theory of mind. But what exactly is the functionalist perspective? Functionalism tries to move beyond both behaviorism and identity theory by taking elements from both. Like those two theories, Functionalism is generally taken to be a materialist theory.

Turing test unit 424 may query a suspicious avatar on behaviorism issues, i.e., a behaviorism test. Behaviorism, also called the learning perspective (where any physical action is a behavior) is a philosophy of psychology based on the proposition that all things which organisms do—including acting, thinking and feeling—can and should be regarded as behaviors. The school of psychology maintains that behaviors as such can be described scientifically without recourse either to internal physiological events or to hypothetical constructs such as the mind. Behaviorism comprises the position that all theories should have observational correlates but that there are no philosophical differences between publicly observable processes (such as actions) and privately observable processes (such as thinking and feeling).

Analysis unit 402 may communicate with speech to text conversion unit 408, OCR/text look-up unit 410, audio recognition unit 406, graphics recognition unit 412, video recognition unit 414 and behavior analysis unit 418. Analysis unit 402 may receive or retrieve information about an avatar from these units 408, 410, 406, 412, 414 and 418.

Analysis unit 402 may communicate with behavior characteristics of known spam avatars table 404 of VU memory 306. This communication may be done by the analysis unit 402, the VU processing unit 305 or another unit within spam avatar identification system 403. Analysis unit 402 may retrieve behavior files from behavior characteristics of known spam avatars table 404 to compare against information which it may have received from text conversion unit 408, text look-up unit 410, audio recognition unit 406, graphics recognition unit 412 video recognition unit 414 or behavior recognition unit 418. Analysis unit 402 may compare files of a single type, for example, audio files or even files having different formats, for example .wav file format files and .mp3 format files. Analysis unit 402 may also compare combinations of file types. For example, analysis unit 402 may compare a combination of a video file and an audio file combination received from video recognition unit 414 and audio recognition unit 406 with a video file and audio file combination of a known spam avatar received from behavior characteristics of known spam avatars table 404 of VU memory 306. Analysis unit 402 may work with recognition units 408, 410, 406, 412, 414 and 418 to compare and analyze the behavior files.

Analysis unit 402, together with units 408, 410, 406, 412, 414, and 418, is able to identify spam avatars from retrieved behavior characteristics from avatars from the VU 401. Analysis unit 402 is further able to identify the magnitude of the similarities and/or dissimilarities of the comparison between retrieved behavior characteristics of the existing avatar and the retrieved behavior characteristics of the known spam avatar. The comparison information may be passed to scoring system 320 so that a spam score for that particular existing avatar can be tabulated by scoring system 320. Spam scores may then be recorded by scoring system 320 in spam avatar identification table 308 for later use.

Figure 5:
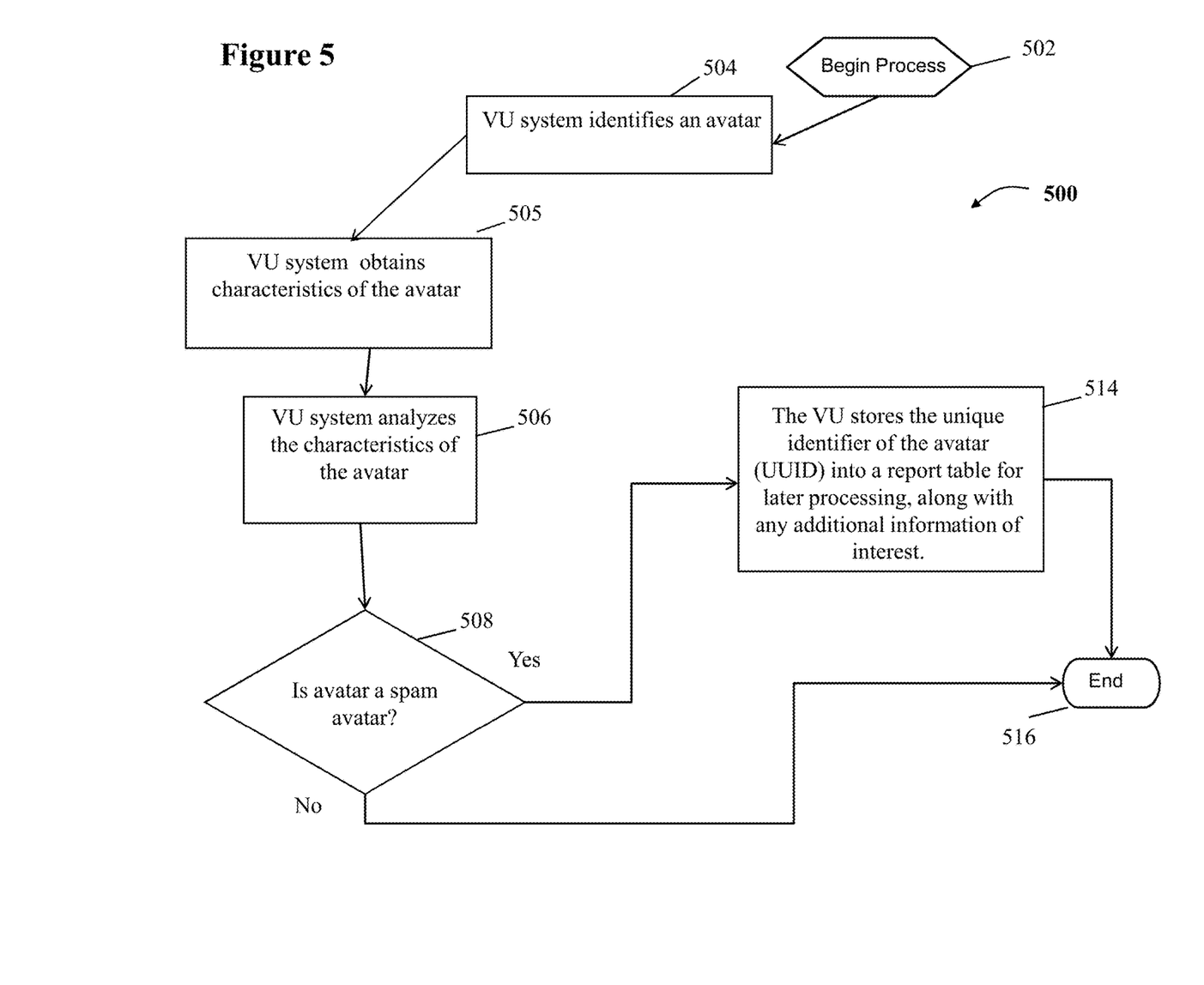
FIG. 5 illustrates the steps associated with an embodiment of the method of the present invention.

FIG. 5 illustrates a method 500 for identifying a spam avatar based upon identifying characteristics of the spam avatar such as behavior characteristics. This method may be invoked upon avatar creation, avatar modification, asset creation, and asset modification. This is shown at step 504. At step 505, VU system obtains the behavior characteristics and analyzes the characteristics of the new avatar. In the case of behavior characteristics, the behavior files of the avatar and assets are passed to or retrieved by the behavior characteristics analysis unit 405 for analysis. For example, with respect to image or graphics files, analysis unit 402 may use an image look-up process (which may include communicating with graphics recognition unit 412 and with behavior characteristics of known spam avatars table 404 of VU memory 306). Analysis unit 402 may retrieve and analyze graphics for similarity to known logos, trade dress, and other images that connote an advertisement. The graphics of the avatar and assets may be passed through OCR/text look-up unit 410 to determine if there is any similarity to known trademarks, service marks, slogans, and other text that connote an advertisement. Depending upon the magnitude of the similarity, a spam score may be assigned to the examined avatar by the scoring system 320 and may be stored in the spam avatar identification table 308.

If the avatar has a concept of audio assets, the entirety or a random selection of the audio clip can be passed through an audio (or audio pattern) recognition system 406 for similarity to known jingles, radio commercials, and other audio that connote an advertisement. Additionally, speech to text conversion can be processed by a speech to text conversion unit 408 and passed to OCR/text look-up unit 410. Analysis unit 402 may assist to provide analysis capability to units 408, 410, 406, 412, 414 and 418 and to retrieve behavior files for analysis from behavior characteristics of known spam avatars table 404. Depending upon the magnitude of the similarity, a spam score may be assigned to the examined avatar by the scoring system 320 and may be stored in the spam avatar identification table 308.

If the avatar has a concept of video textures, then random graphic snapshots of the video can be processed the same way as discussed above. This may be done by video recognition unit 414 and graphics recognition unit 412. The audio component of the video can be processed the same manner. This may be done by audio recognition unit 402.

Figure 7:
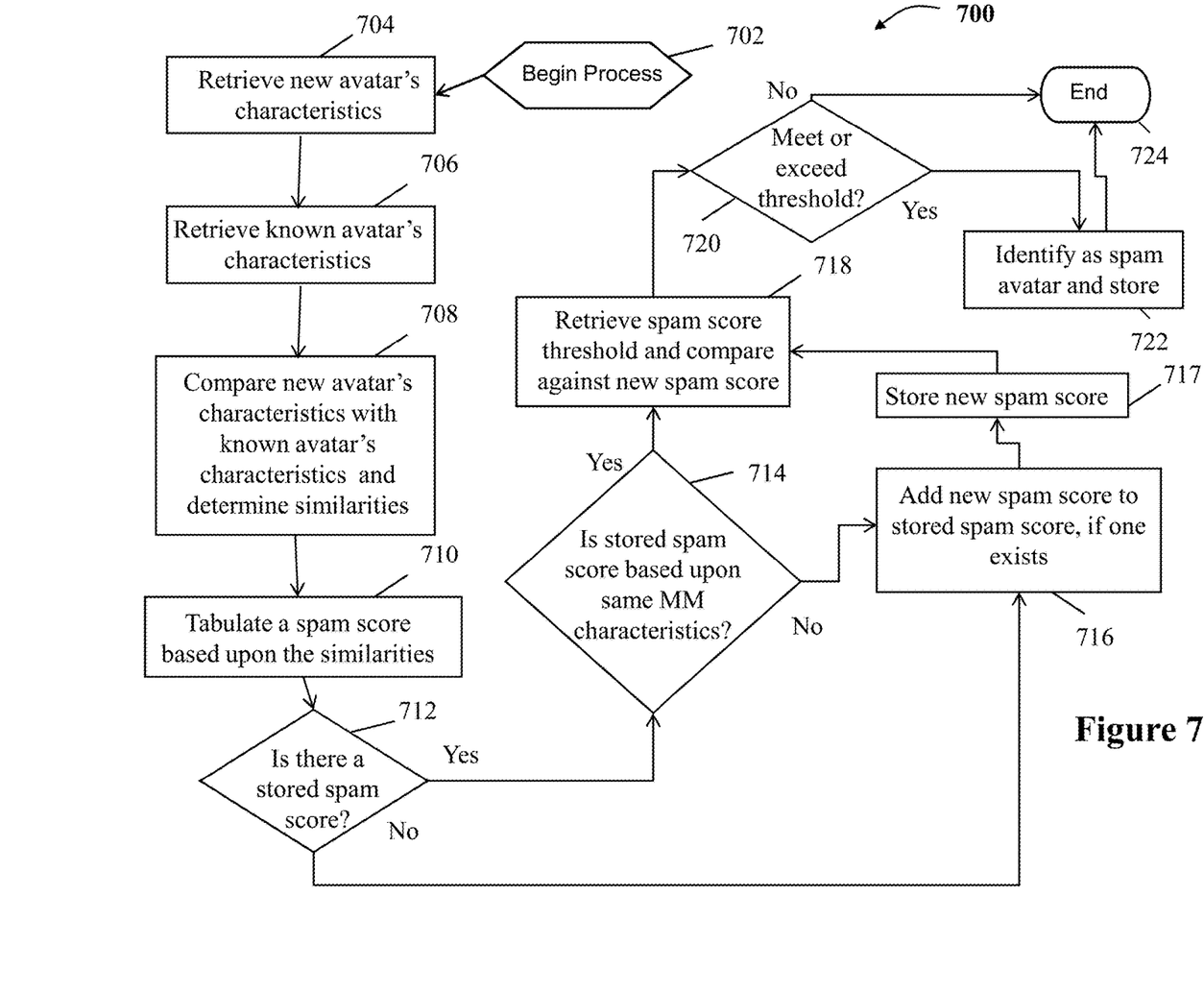
FIG. 7 is an illustrative embodiment of the method of the present invention for identifying spam avatars by calculating a spam score.
Figure 8:
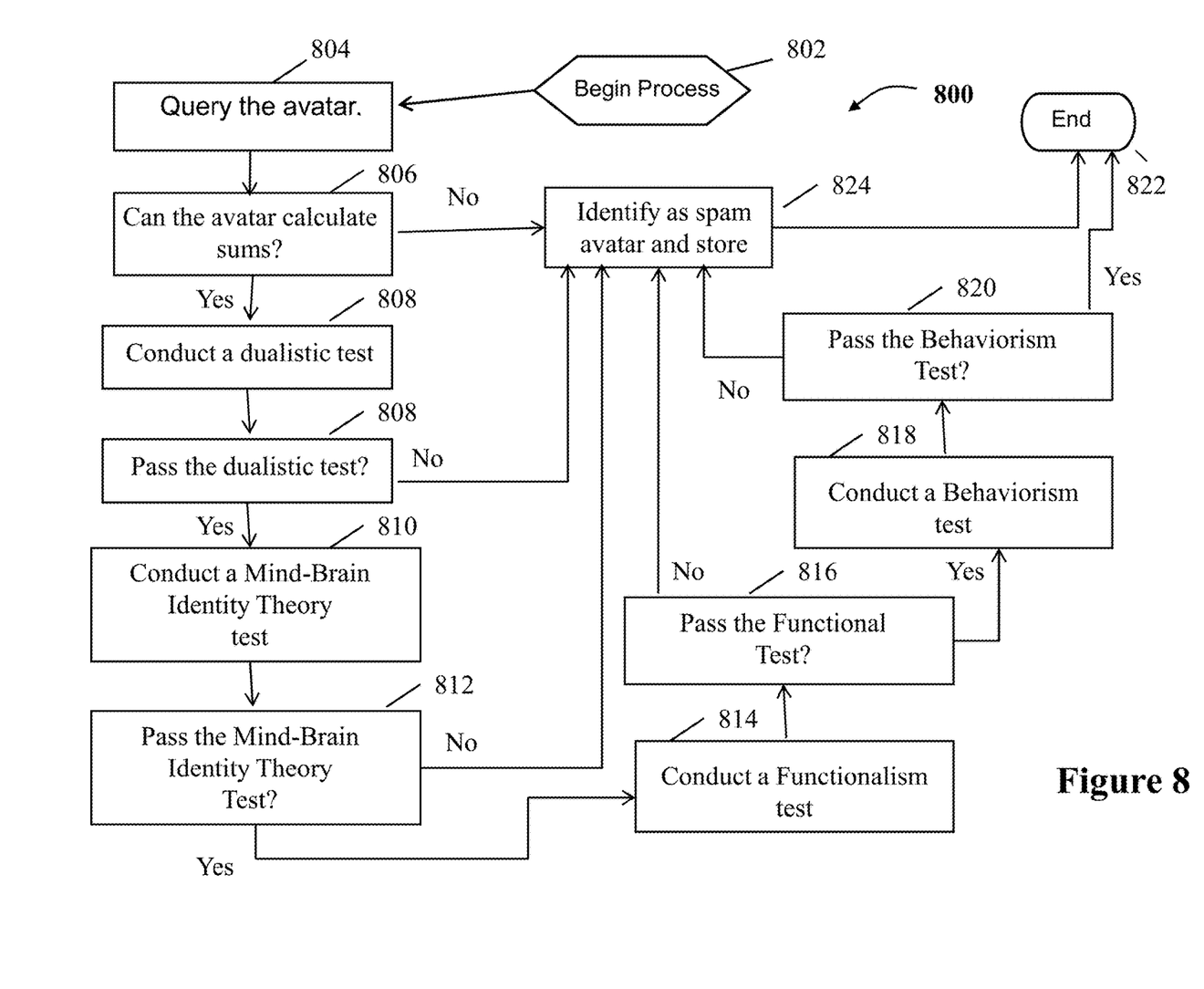
FIG. 8 is an illustrative embodiment of the method of the present invention for identifying spam avatars by performing Turing tests.

If the avatar is a spam avatar, the UUID of the potential advertising asset, the UUID of the avatar associated with the asset, and any other information is added to a report table 318, for later processing at step 514. An example of an embodiment of the present invention for determining whether an examined avatar is a spam avatar is shown in FIG. 7 to be discussed below. An example of other information can include details of the behavior characteristics that the avatar or asset characteristics were determined to be similar to, and a score can be calculated by the scoring system 320 to convey probability of a match. The scoring system 320 can be described as system using any statistical method known in the field, such as using the percentage of similarity as the score, or weighting certain types of behavior as relatively greater or lesser (such as putting greater emphasis on the more mature field of OCR since it may be considered to be a more reliable indicator).

The characteristics analysis can also be an analysis of the avatar's behavior to identify VU spam. Behavior in the VU can be defined as:
 Coordinate changes of avatar positional movement;
 Coordinate changes of avatar bodily movement, such as gestures and expressions;
 Communication, such as text or audio chat to individuals, to groups, or to broadcast; and/or
 Information from the real-world client representing the avatar.

This type of analysis may be invoked continually on all avatars or a selected avatar, for a limited time, automatically upon receipt of a potential spam avatar report, or upon request.

Figure 6:
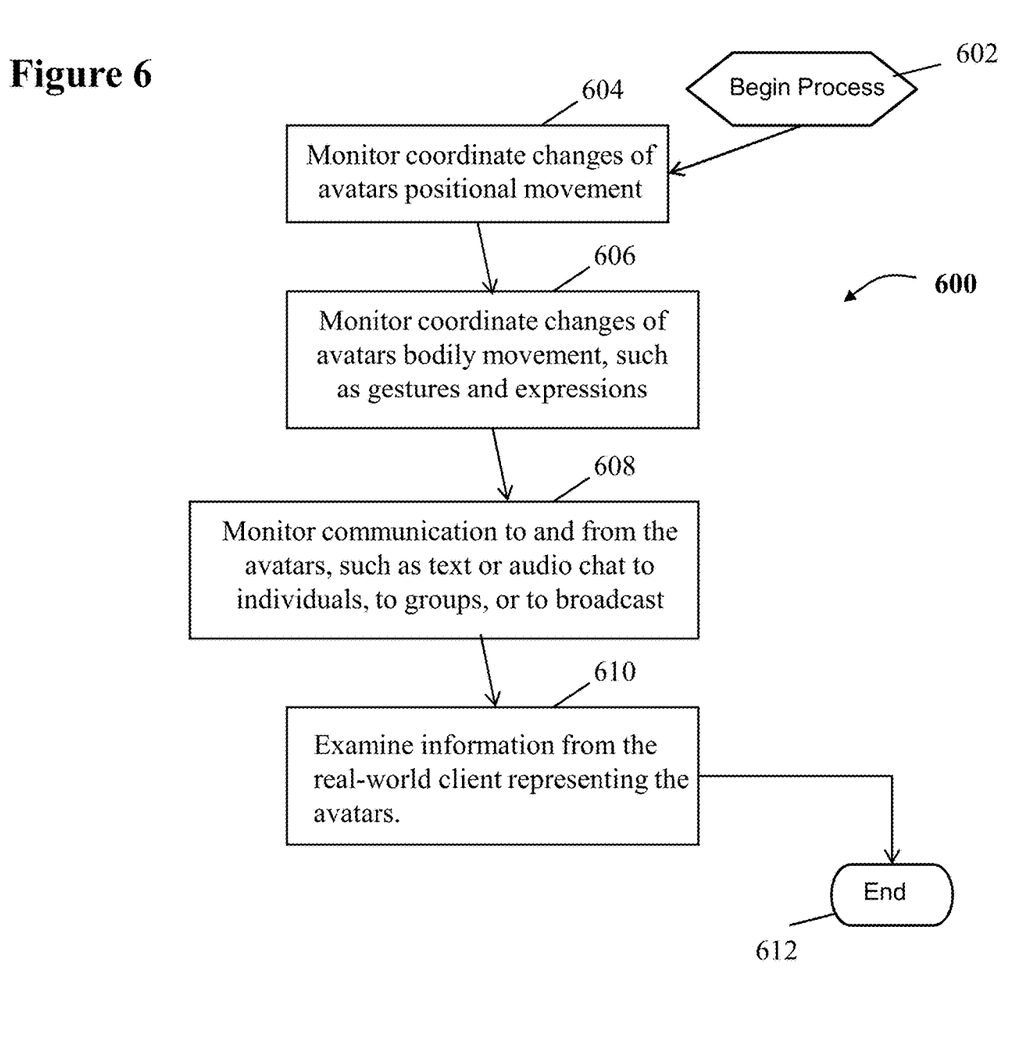
FIG. 6 illustrates the steps associated with another embodiment of the method of the present invention.

As shown in FIG. 6, a behavior analysis process 600 begins at 602. The process may include monitoring of coordinate changes of avatar positional movement at 604 and calculating the similarity of this movement to known spam avatars, to known non-spam avatars, and to anticipated behavior. This can be based on any travel data, such as number of times in a set period the avatar travels from another avatar to another avatar, initiating communication to each avatar, and factoring in return trips to previous avatars (an automated traveling advertiser would likely avoid repeat visits, except after some time had elapsed). Similarly, the "smoothness" of movement and duration of movement between breaks can be calculated, which may indicate an automated avatar (humans are interrupted and humans do require breaks). Coordinate changes of avatar bodily movement, such as gestures and expressions, can also be monitored at 606. The similarity of this movement is compared against that of known spam avatars, of known non-spam avatars, and of anticipated behavior. For example, it may be discovered or anticipated that a travelling advertiser would likely offer to shake hands with every avatar they encounter, or would try to offer an asset such as a pamphlet or sample to every avatar. Communication, such as text or audio chat that proceeds from the avatar, is monitored at 608. For example, a spam avatar is anticipated to initiate communication in the same way or using the same alternating phrases, or to utter statements that are likely to be solicitations, such as "Would you like to buy . . . " or "Would you like a low interest loan?". The analysis of audio chat would have an intermediate step of parsing the audio to text, such as discussed above.

Using the systems and methods of the present invention, information is monitored from the real-world client representing the avatar, such as if the client remains active in a pattern that is non-human (robots do not need to log out, exit, or leave the computer to go sleep) is monitored. Other information can include the IP address or owner of the IP address range (such as if an IP or IP range belong to known previous spam avatars). Other information can include the date and time the user registered corresponding with or to a pattern of registration of known spam avatars, especially if this is corroborated by the IP address or range. For example, a spam developer may register a batch of users in sequence. Other information can include the time it took to register, where a spam developer is likely to have automated the registration process or portions of it, such as forms prior to a form requiring human interaction such as to bypass a CAPTCHA. Other information can include an analysis of friends' lists, such as whether a user has been declared to be a friend by known human-controlled avatars, especially after the initial exploratory period, which could be defined by an administrator. As discussed previously, the UUID of the monitored avatar along with a combination of the calculated scores from any of the preceding steps, or an entry for each event, and any other information such as recording of movement or communication is added to a report table 318 in the VU memory, for later processing.

FIG. 7 is an illustrative embodiment of a method 700 of the present invention for determining whether a new avatar is a spam avatar which starts at 702 after a new avatar has been identified. It is noted that "new avatar" may be a new avatar being created, a new avatar entering into a new area in the VU, changes made to an existing avatar, etc. At 704, the behavior characteristics of the new avatar are retrieved. As noted with respect to the system of the type described in relation to FIG. 4, behavior characteristics can be such characteristics as sound, voice, image, video, text, movement, behavior, etc. At 706, the behavior characteristics of known spam avatars are retrieved and compared, at 708, against the behavior characteristics of the new avatar are retrieved to determine the similarities between the behavior characteristics of the new avatar and the behavior characteristics of known spam avatars. Note that these steps can performed serially in a repeatable, loop fashion for each behavior characteristic of the new avatar and for each of the known spam avatars or done in parallel. At 710, a spam score is determined for the new avatar. At 712, it is determined whether there is a spam score previously stored for the new avatar. If so, at 714, it is determined whether the stored spam score is based upon the same behavior characteristics (or some of the same behavior characteristics) as are presently being compared. The intent is that scores from previously analyzed characteristics should not accumulate based upon the fact that they are reanalyzed. If not, add spam score (based on behavior characteristics not previously analyzed and scored) to stored spam score to form a sum new spam score at 716 and the updated spam score is stored at 717. If the new spam score is based upon the same behavior characteristics which formed the basis of the stored score, the new spam score is not added to the related stored spam score. At 718, a spam score threshold is retrieved and compared against the new spam score and at 720 it is determined whether the new spam score meets or exceeds the spam score threshold. If so, at 722, the new avatar is identified as a spam avatar and stored as such in the spam avatar identification table 308 and the process ends at 724.

As discussed above, the UUID of the avatar, the score of the test, and other information such as date and time of test and index of questions or methods used in the test is added to a report table, for later processing. Rapid discrimination of software from humans may have a number of other applications including:

knowing whether an advertiser is paying for "software" or "human" eyes to look at an advertisement;

knowing whether malicious intent is involved when a number of software avatars descend at once upon a given VU region;

allowing some VU's to optionally publicize whether a given avatar is software controlled or human controlled ("is that beautiful woman I've been chatting with the past few weeks really human?"); or decisions by region owners to only allow human-based avatars into a region (for obvious business reasons).

Thus, periodic determination, and optional publication, of software-versus-human control for avatars has impact to unsolicited advertising, and to many other segments of Virtual Universe interaction.

It should be understood that the present invention is typically computer-implemented via hardware and/or software. As such, and client systems and/or servers will include computerized components as known in the art. Such components typically include (among others), a processing unit, a memory, a bus, input/output (I/O) interfaces, external devices, etc. It should also be understood that although a specific embodiment involving 2D and 3D virtual renditions of physical resources which are automatically created to replicate real-life environments, such as computer data centers and other trackable assets has been depicted and described, the present invention could be implemented in conjunction with any type of real-life environments having trackable assets.

While shown and described herein as a system and method for identifying spam avatar in a virtual universe through behavior analysis, it is understood that the invention further provides various alternative embodiments. For example, in one embodiment, the invention provides a computer-readable/useable medium that includes computer program code to enable a computer infrastructure to automatically create two dimensional (2D) and three dimensional (3D) virtual renditions of physical resources to replicate real-life environments, such as computer data centers and other trackable assets. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory and/or storage system (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a computer-implemented method for identifying spam avatar in a virtual universe through behavior analysis. In this case, a computerized infrastructure can be provided and one or more systems for performing the process steps of the invention can be obtained (e.g., created, purchased, used, modified, etc.) and deployed to the computerized infrastructure. To this extent, the deployment of a system can comprise one or more of (1) installing program code on a computing device, such as computer system from a computer-readable medium; (2) adding one or more computing devices to the computer infrastructure; and (3) incorporating and/or modifying one or more existing systems of the computer infrastructure to enable the computerized infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method comprising:
   executing a Turing test to test one or more avatars in a virtual universe (VU), wherein the Turing test evaluates changes of avatar bodily movement;
   determining, based on a result of the Turing test, behavior characteristics of the one of the one or more avatars, wherein the behavior characteristics comprise whether each of the one or more avatars is able to demonstrate human intelligence;
   identifying similarities between the determined behavior characteristics with the behavior characteristics of known spam avatars; and
   identifying whether the one of the one or more avatars is an automated, non-human operated spam avatar created by an advertiser operating within the VU based upon the identified similarities.

2. The method as defined in claim 1, further comprising:
   calculating a spam score based upon the identified similarities; and
   wherein the identifying the one of the one or more avatars as an automated, non-human operated spam avatar is further based upon the calculated spam score.

3. The method as defined in claim 1, further comprising:
   calculating a spam score based upon the identified similarities;
   comparing the calculated spam score with the spam score threshold; and
   wherein the identifying the one of the one or more avatars as an automated, non-human operated spam avatar is further based upon the comparison.

4. The method as defined in claim 1, further comprising:
   determining that one of the one or more avatars is not able to calculate sums;
   wherein the identifying the one of the one or more avatars as an automated, non-human operated spam avatar is further based upon the determining that one of the one or more avatars is not able to calculate sums.

5. The method as defined in claim 4, further comprising:
conducting a mind brain identity test;
determining that the one or more avatars does not pass the mind brain identity test,
wherein the identifying the one of the one or more avatars as an automated, non-human operated spam avatar is further based upon the one or more avatars does not pass the mind identity test.

6. The method as defined in claim 1, further comprising:
conducting a functionalism test;
determining that the one or more avatars does not pass the functionalism test,
wherein the identifying the one of the one or more avatars as an automated, non-human operated spam avatar is further based upon the one or more avatars does not pass functionalism test.

7. The method as defined in claim 1, further comprising:
conducting a behaviorism test;
determining that the one or more avatars does not pass the behaviorism test,
wherein the identifying the one of the one or more avatars as an automated, non-human operated spam avatar is further based upon the one or more avatars does not pass the behaviorism test.

8. The method as defined in claim 1, wherein a solution service provider deploys a computer infrastructure operable to perform the method.

9. A system comprising:
a virtual universe (VU) processing unit;
a behavior characteristics analysis unit;
a memory unit that stores behavior characteristics of known spam avatars;
a communications channel for allowing the VU processing unit, the memory unit and the behavior characteristics analysis unit to communicate,
wherein the system:
  executes a Turing test to test one or more avatars in a virtual universe (VU), wherein the Turing test evaluates changes of avatar bodily movement;
  determines, based on a result of the Turing test, behavior characteristics of the one of the one or more avatars, wherein the behavior characteristics comprise whether each of the one or more avatars is able to demonstrate human intelligence;
  identifies similarities between the determined behavior characteristics with the behavior characteristics of known spam avatars; and
  identifies whether the one of the one or more avatars is an automated, non-human operated spam avatar created by an advertiser operating within the VU based upon the identified similarities.

10. The spam identification system as defined in claim 9, wherein the system further recognizes the movement of the avatar.

11. The system as defined in claim 9, wherein the system further determines if the avatar is operated by a machine.

12. The system as defined in claim 11, where the system further recognizes the behavior characteristics of the avatar that are audio characteristics.

13. The system as defined in claim 12, wherein the system further recognizes the behavior characteristics of the avatar that are behavior characteristics.

14. The system as defined in claim 13, wherein the system further calculates a spam score based upon the identified similarities, and compares the calculated spam score with the spam score threshold; wherein the memory unit stores a spam score threshold.

15. The system as defined in claim 14 further comprising a spam avatar identification table that stores a unique identifier of known spam avatars.

16. The system as defined in claim 15 further comprising a behavior characteristic of known spam avatars table that stores behavior characteristics of known spam avatars.

17. A computer program product embodied in a computer readable hardware storage device for operating in a system comprising a network I/O, a CPU, and one or more databases, for implementing a method in a virtual universe (VU) system, the method comprising:
  executing a Turing test to test one or more avatars in a virtual universe (VU), wherein the Turing test evaluates changes of avatar bodily movement;
  determining, based on a result of the Turing test, behavior characteristics of the one of the one or more avatars, wherein the behavior characteristics comprise whether each of the one or more avatars is able to demonstrate human intelligence;
  identifying similarities between the determined behavior characteristics with the behavior characteristics of known spam avatars; and
  identifying whether the one of the one or more avatars is an automated, non-human operated spam avatar created by an advertiser operating within the VU based upon the identified similarities.

18. The computer program product as defined in claim 17, wherein the method further comprises:
determining that one of the one or more avatars is not able to calculate sums;
wherein the identifying the one of the one or more avatars as an automated, non-human operated spam avatar is further based upon the determining that one of the one or more avatars is not able to calculate sums.

19. The computer program product as defined in claim 17, wherein the method further comprises:
conducting a mind brain identity test;
determining that the one or more avatars does not pass the mind brain identity test,
wherein the identifying the one of the one or more avatars as an automated, non-human operated spam avatar is further based upon the one or more avatars does not pass the mind identity test.

20. The computer program product as defined in claim 17, the method further comprising:
conducting a functionalism test;
determining that the one or more avatars does not pass the functionalism test,
wherein the identifying the one of the one or more avatars as an automated, non-human operated spam avatar is further based upon the one or more avatars does not pass functionalism test.

* * * * *